Figure 1:
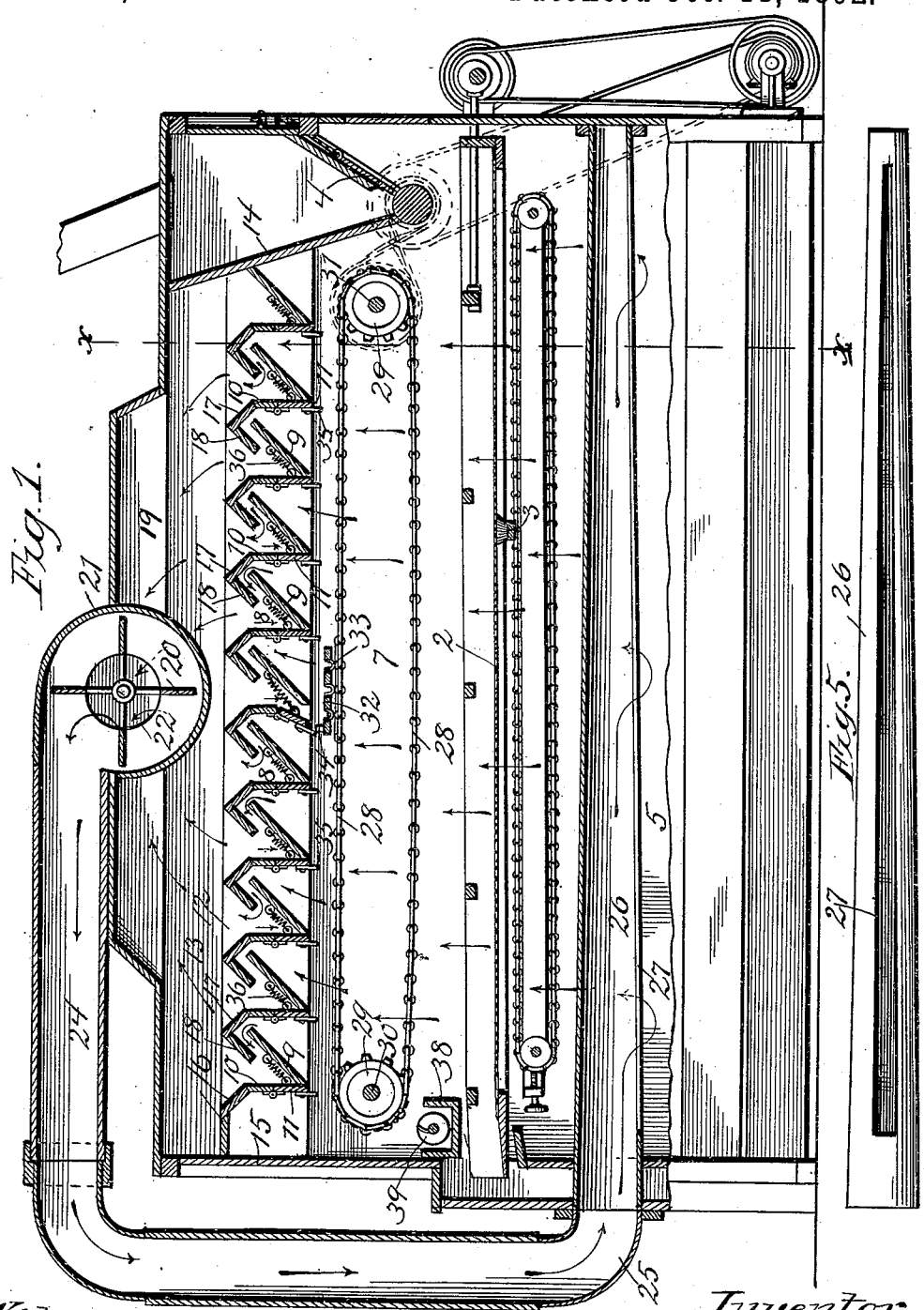

(No Model.) 2 Sheets—Sheet 1.

J. J. GERARD.
DUST COLLECTOR.

No. 484,090. Patented Oct. 11, 1892.

Witnesses.
J. Jessen
O. F. Hawley.

Inventor:
John J. Gerard,
By Paul & Merwin atty's (No Model.) 2 Sheets—Sheet 2.
J. J. GERARD.
DUST COLLECTOR.
No. 484,090. Patented Oct. 11, 1892.
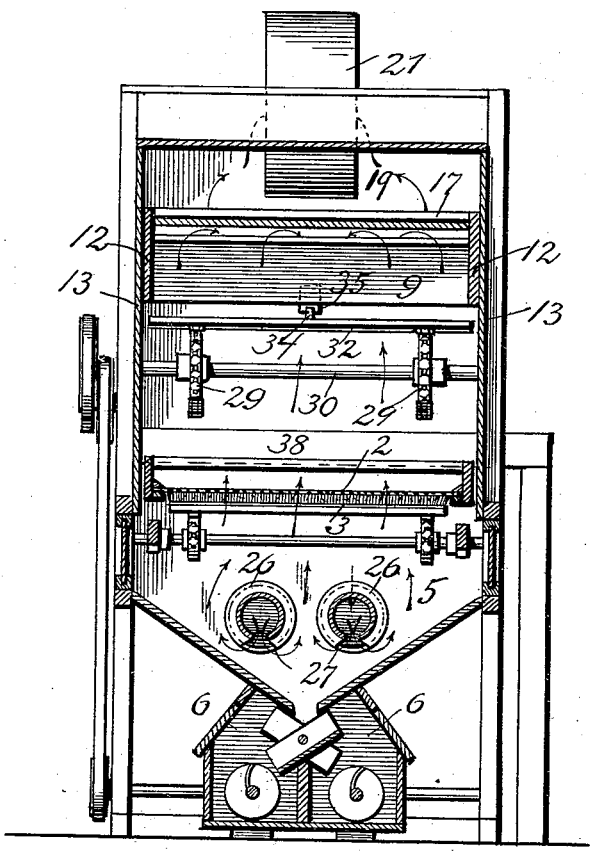
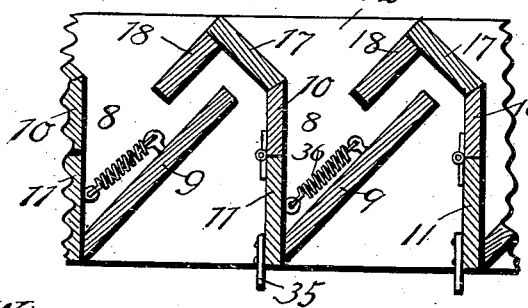
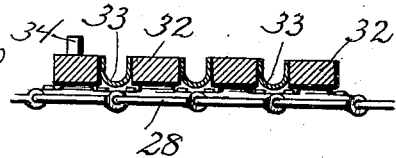
Witnesses.
J. Jensen
O. F. Hawley.
Inventor:
John J. Gerard.
By Paul & Mumm Attys.

UNITED STATES PATENT OFFICE.

JOHN J. GERARD, OF MINNEAPOLIS, MINNESOTA.

DUST-COLLECTOR.

SPECIFICATION forming part of Letters Patent No. 484,090, dated October 11, 1892.

Application filed May 6, 1892. Serial No. 432,013. (No model.)

*To all whom it may concern:*

Be it known that I, JOHN J. GERARD, of Minneapolis, in the county of Hennepin and State of Minnesota, have invented certain Improvements in Dust-Collectors, of which the following is a specification.

My invention relates to dust-collectors, and especially to means for catching and disposing of the dust in middlings-purifiers; and the object of the invention is to provide positively-acting devices which will be of a durable construction, which will occupy a very small space, and which may be operated continuously without derangement or clogging, maintaining at all times an even action and efficiency.

The invention consists in the combination, with the chamber wherein the dust-laden air is contained, of a series of pockets, each provided with a discharge opening and valve, narrow ducts leading from said chamber into a settlings-chamber above said pockets, and means for discharging the dust which is collected, in a particular arrangement of the same in connection with a middlings-purifier, and a continuous air belt or circuit, all substantially as hereinafter described, and particularly pointed out in the claims.

My invention will be more readily understood by reference to the accompanying drawings, forming a part of this specification, and in which—

Figure 1 is a longitudinal and vertical section of a middlings-purifier provided with a dust-collector embodying my invention. Fig. 2 is a transverse vertical elevation on the line *x x* of Fig. 1. Fig. 3 is an enlarged detail view of two of the dust-collecting pockets or hoppers. Fig. 4 is an enlarged detail view of the dust-carrier, also arranged to operate the valves or swinging gates of the pockets. Fig. 5 is a detail bottom view of one of the inlet-pipes.

In the drawings my invention is illustrated in connection with a middlings-purifier of the well-known construction, having the reciprocating sieve 2, the traveling cleaner-brush 3, the automatic feeder 4, the large longitudinal hopper 5, and the conveyer-troughs 6, arranged beneath the same. Above the sieve is the large chamber 7, into which the dust from the sieve rises. Within this large chamber I introduce the series of pockets or hoppers 8, made up of the inclined boards 9, the vertical boards 10, and the swinging hinged valves or gates 11, all extending clear across the machine between the side boards 12, which are secured on the outer walls 13 thereof. The inclined board at one end extends against the transverse wall 14 of the feed-hopper 4, while at the other end the space between the last hopper and the end wall 15 of the machine is closed by the boards 16. From the upper edge of each part 10 an inclined board 17 extends back over the upper edge of the inclined spout 9, and from thence extends the downwardly-projecting board 18, a narrow space or channel being thus formed through which the dust-laden air is conducted from the chamber 7 over the upper edge of the board 9 and deflected from thence down into the small hopper or pocket 8. The space between the lower edge of the board 18 and the inner face of the board 10 is much larger than the narrow channel, and in consequence the air expands and loses its velocity at this point, thereby freeing the particles of dust which are precipitated into the bottom of the hopper. This action is repeated at each of the pockets, so that the volume of dust-laden air after passing through the same into the upper chamber 19 will there be found clear.

In the top of the purifier and in the chamber 19 is the suction-fan 20, arranged within the circular case 21, having in its sides a central opening 22, communicating with the settlings-chamber 19. From this fan the dust-free air may, if desired, be blown out of doors, the air being originally admitted through openings arranged beneath the sieve of the purifier; but I prefer to connect with the outlet or discharge of the suction-fan a pipe or duct 24, having a downwardly-extending part communicating at the elbow 25 with one or more of the tapering inlet-pipes 26. Where two are employed, separate connections with the pipe 24 are preferably provided. In the bottom of each pipe 26 is a long tapering slot 27, through which the air is blown into the hopper 5 beneath the large sieve, through which it passes to carry the dust from the middlings through the dust-collecting pockets and back to the fan, a continuous air circuit or belt being thus established. The tapering pipes have their ends secured at opposite ends of the machine, and I give them the form shown and also form the slots 27 as indicated in order to give a proportionate air discharge and pressure from the pipes and in the machine, respectively, to correspond with the thickness of the layer of material at the different points on the sieve.

It is obvious that means must be provided for emptying the dust-collecting pockets in order to prevent clogging of the air-current and inefficient action of the dust-collector. For this purpose I provide the two endless sprocket-belts 28, operating over the pairs of sprocket-wheels 29, provided on the shafts 30 and 31, arranged in the ends of the machine, and upon these belts secure the cross-slats 32, having between them the flexible strips 33 to close the spaces between the several slats 32, which thus form a traveling table or carrier upon which the dust is dropped when the lug 34 thereon successively strikes the depending lugs 35 of the several hopper-valves. Each valve has a retaining-spring 36 to close it immediately upon its release from the lug 34. In one end of the machine toward which the upper sides of the belts travel and beneath the sprocket-wheels I provide the transverse dust-trough 38, into which the dust finally drops from the carrier as it passes around the under side of the sprocket on its return travel. A screw-conveyer 39 in the trough 38 carries off the waste material. The dust-pockets are thus periodically opened by the slowly-moving dust table or carrier, the speed of which may be regulated in accordance with the rapidity with which the dust collects in the pockets.

Having thus described my invention, I claim as new and desire to secure by Letters Patent—

1. The combination, in a dust-collector, of a dust-hopper provided with the discharge-valve, with the traveling carrier adapted to open said valve and receive the dust from said hopper, substantially as described.

2. The combination, in a dust-collector, of a series of pockets or settlings-chambers, with valves therefor and a traveling dust-carrier arranged to open said valves and receive the dust from said hoppers, substantially as described.

3. The combination, with a series of valved pockets, of means for deflecting the dust-laden air into the same to precipitate the dust into the same and means for successively opening the valves of said pockets and conducting away the dust, substantially as described.

4. The combination, with a chamber for the dust-laden air and a chamber for the dust-freed air, of a series of dust-pockets or settlings-chambers interposed between the same, means for drawing the dust-laden air into said pockets and for deflecting the same thereinto, said pockets provided with discharge-valves, and a traveling carrier arranged to successively open said valves and carry away the dust, substantially as described.

5. The combination, with a separating device, of the inclosing walls, a series of valved dust-collecting pockets provided above said device, a traveling carrier and valve-opener to receive the dust therefrom, a suction-fan arranged above said pockets to take the air rising therefrom, and a duct leading therefrom and arranged to discharge the air beneath said separating device, substantially as described.

6. The combination, with the large chamber, of a separating device arranged therein, a series of dust-collecting pockets arranged above the same and each provided with a valve, the narrow channels or throats arranged between said hoppers or pockets, the deflectors arranged above the same, lugs arranged upon said valves, the traveling carrier, a trough or hopper to receive the dust therefrom, and means for creating a current of air through said channels and pockets, substantially as described.

7. The combination of the inclosing walls and means for creating an air-current within the same, the dust-collecting pockets or hoppers having the inclined walls 9, the walls 10, and the hinged valves or gates, springs to normally close the same, the narrow channels being formed between the upper edges of said parts, the oppositely-inclined parts 17 and 18, the endless belts, the cross-slats arranged thereon, and the flexible strips arranged between said cross-slats, thereby forming the dust-carrier, and the same being adapted to successively engage said gates to open the same, substantially as described.

8. The combination, with a series of dust-collecting pockets or hoppers, of the hinged valves or gates thereof, the endless belts and the shafts and wheels thereof, the cross-slats 32, arranged on said belts, the flexible strips provided between said slats, a lug on the forward slat to engage a lug provided on each of said gates, a receiving-trough 38, and a conveyer provided therein, all substantially as and for the purpose specified.

In testimony whereof I have hereunto set my hand this 29th day of April, A. D. 1892.

JOHN J. GERARD.

In presence of—
C. G. HAWLEY,
P. S. LYON.